June 9, 1942.     S. H. SWIFT     2,285,541
WHEEL LOCKING DEVICE
Filed Feb. 5, 1942
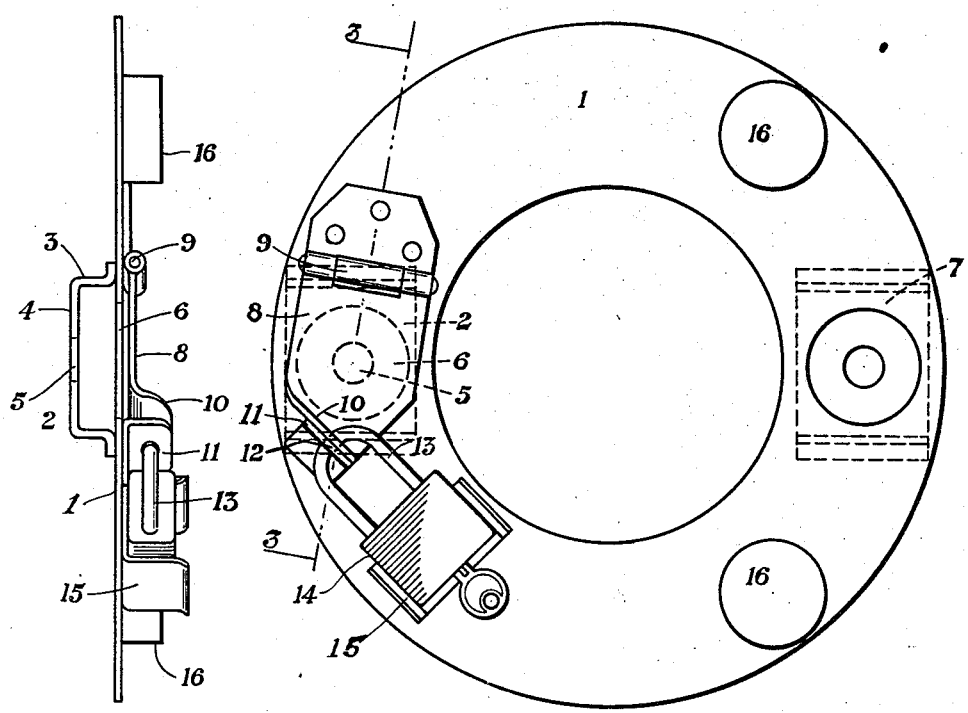
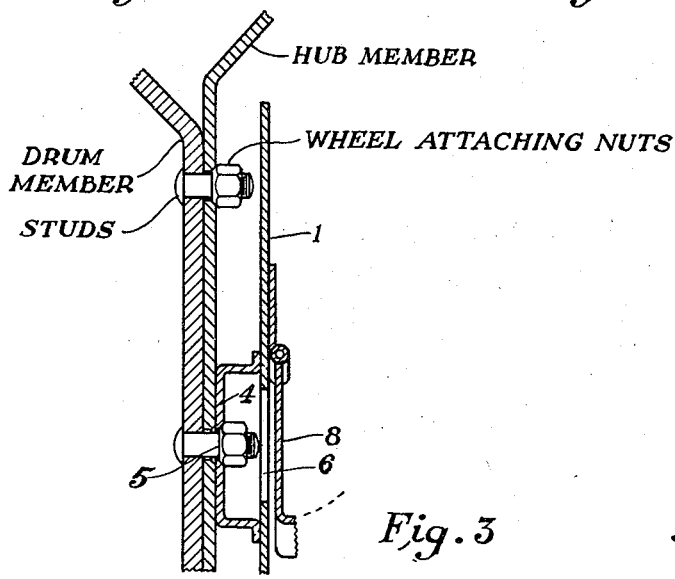
INVENTOR
STANLEY H. SWIFT Patented June 9, 1942

2,285,541

UNITED STATES PATENT OFFICE 2,285,541

WHEEL LOCKING DEVICE

Stanley H. Swift, Saginaw, Mich.

Application February 5, 1942, Serial No. 429,633

1 Claim. (Cl. 70—259)

This invention relates to improvements in locking devices adapted for special application to mounted or spare wheels.

An object of the invention is to provide a locking device which will maintain the desirable dynamic or running balance of the wheel when being rotated at a high speed.

A further object is to provide a locking device which may be quickly and conveniently applied to a wheel without altering the structure of any part or substituting any different element in a conventional wheel mounting.

Another object is to provide such a locking device embodying only a few simplified parts that are adapted to be manufactured from inexpensive material and are capable of being assembled at small cost to produce a unitary accessory device for locking a wheel to its mounting.

With the foregoing and certain other objects in view, which will appear later in the specification, my invention comprises the devices described and claimed and the equivalents thereof.

In the accompanying drawing forming a part of this specification, wherein like numerals are employed to designate like parts, Fig. 1 is a face view of a locking device embodying my invention;

Fig. 2 is an edge view of the parts shown in Fig. 1; and

Fig. 3 is a fragmentary sectional view taken on the line 3—3 of Fig. 1, showing my improvement as applied to a wheel hub member and brake drum member of a conventional automotive wheel assembly.

In the drawing a preferred embodiment of my invention is shown as a wheel locking device for automotive vehicles. Numeral 1 designates a plate of annular shape whose mean diameter is approximately that of the usual circular row of wheel-attaching studs or bolts. Such bolts are usually present on the flat face of an automotive vehicle drum, as I have indicated diagrammatically in Fig. 3.

A U-shaped bracket 2 has its flange 3 fixed to the inner face of the plate 1 and its web 4 is spaced from the plane of the plate.

When, as in Fig. 3, the plate 1 has been applied to the flat central part of the hub member of a wheel, and the wheel has been secured to the flat central part of the drum member, one of the wheel-attaching studs or bolts will extend through a hole 5 provided in web 4.

A hole 6 is provided in plate 1 large enough to receive a socket wrench for tightening the nut onto the web 4. Thus the drum member, the hub member of the wheel and the bracket 2 of annular plate 1 may be fastened together by the usual wheel-attaching nut. Bracket 2 is preferably deep enough to comprise an encasement for the nut on the stud. A like bracket 7 may be secured to a diametrically opposite portion of the annular plate, substantially as indicated by broken lines in Fig. 1.

A movable cover 8, preferably hinged, is mounted on the outer face of plate 1 for opening or closing hole 6.

Here it may be noted that at least one of the holes 6 is thus equipped with a cover, and others may be, if desired. The free member of cover 8 may have an upwardly turned flange 10 arranged to register in closed position with lug 11 on the plate. Members 10 and 11 are provided with holes 12 to receive the hasp 13 of a lock 14. The lock is releasably retained on plate 1, as by spring clips 15. Counterweights 16, 16 are fixed to plate 1 and preferably are located diametrically opposite the cover and lock assembly.

The weights are adequate as to size, arrangement, and location to provide dynamic or running balance for the assembly when the wheel which carries the locking device is being rotated at high speed.

In practice, such running balance is important when adapting the device to conditions of use of automotive vehicle wheels because in such cases it is desirable to avoid as far as possible the tendency of the wheel to shimmy.

In applying the above described embodiment of my invention to the wheel of an automobile of current design, the user first pries off the hub cap and then removes one of the wheel-attaching nuts from its stud, or else removes one of the wheel-attaching machine bolts, as the case may be. The device is then placed on the hub member as shown in Fig. 3, with the stud from which the nut was removed projecting through the hole 5 in the web of the bracket. The cover 8 is opened and the nut is threaded onto the stud and tightened by a socket wrench inserted through the hole 6.

Another stud is similarly received in another bracket 7 and its nut is put in place and tightened.

Then the cover 8 is closed and fastened by means of lock 14, which may be kept from rattling by being pushed into the spring keepers 15.

Unauthorized access to one of the wheel-attaching nuts is prevented until the lock is opened. That nut also prevents removal or loosening of the plate 1, which covers all the other nuts except the one at 7, which may also be provided with a cover and a lock if desired. In that case one or both of the counterweights 16 may be omitted because the second lock will at least partly balance the first rotationally.

I prefer to use at least two brackets 2, 7, as shown, in order to impart greater rigidity to the annular plate 1 during high speed rotation of the wheel on which the device is mounted.

Having thus described my invention, what I claim and desire to secure by Letters Patent is:

A wheel locking device comprising in combination an annular plate, a bracket fixed to the inner face of said plate and having a web spaced from the plate and provided with a hole for receiving a wheel-attaching stud, said bracket presenting an encasement for a nut on such stud, a similar bracket on said inner face and substantially opposite the first-mentioned bracket, a hole being provided in said plate opposite the hole in each bracket web and adapted to receive the nut and also a socket wrench for said nut, a movable cover mounted on the outer face of said plate adjacent at least one of the holes in the plate, and a lock adapted to releasably secure such cover and plate together.

STANLEY H. SWIFT.